(12) United States Patent
Abdel-Fattah et al.

(10) Patent No.: US 10,900,204 B2
(45) Date of Patent: Jan. 26, 2021

(54) WATER MANAGEMENT USING WATER CONSUMING BEHAVIOR TO CONTROL WATER FLOW

(71) Applicant: International Business Machines Corporation, Armonk, NY (US)

(72) Inventors: Ahmed I. Abdel-Fattah, Cairo (EG); Ossama Emam, Cairo (EG)

(73) Assignee: International Business Machines Corporation, Armonk, NY (US)

( * ) Notice: Subject to any disclaimer, the term of this patent is extended or adjusted under 35 U.S.C. 154(b) by 22 days.

(21) Appl. No.: 16/384,553

(22) Filed: Apr. 15, 2019

(65) Prior Publication Data
US 2019/0242099 A1 Aug. 8, 2019

Related U.S. Application Data

(63) Continuation of application No. 15/492,588, filed on Apr. 20, 2017, now Pat. No. 10,329,744.

(51) Int. Cl.
*E03B 7/07* (2006.01)
*E03C 1/05* (2006.01)
(Continued)

(52) U.S. Cl.
CPC .............. *E03B 7/078* (2013.01); *E03B 7/072* (2013.01); *E03B 7/075* (2013.01); *E03C 1/057* (2013.01);
(Continued)

(58) Field of Classification Search
CPC .......... E03B 7/078; E03B 7/072; E03B 7/075; G06K 9/00355; G06F 3/017; G05D 7/0623; E03C 1/057; G06Q 50/06
See application file for complete search history.

(56) References Cited

U.S. PATENT DOCUMENTS 3,670,167 A 6/1972 Forbes
5,979,776 A 11/1999 Williams
(Continued)

FOREIGN PATENT DOCUMENTS

WO WO2006002647 A1 1/2006
WO WO2014178920 A2 11/2014

OTHER PUBLICATIONS

Apr. 20, 2017, U.S. Appl. No. 15/492,588, 2018-0305906.
(Continued)

*Primary Examiner* — Ziaul Karim
(74) *Attorney, Agent, or Firm* — Scully, Scott, Murphy & Presser, P.C.; Scott Dobson, Esq.

(57) ABSTRACT

Embodiments of the invention provide a method, system and computer program product for managing water consumption when a user engages in a specified water using activity. In an embodiment, the method comprises detecting user movement during said activity; detecting water usage during said activity; creating a pattern associating said user movements with said water usage over a specified period of time; and using said pattern to control a supply of water for the user when the user engages in the water using activity. In an embodiment, movement sensors are used to generate data representing movement of the user during the water using activity; water sensors are used to generate data representing water usage during the water using activity; and the movement data and the water data are processed to generate a data structure correlating the user movement data with the water data.

17 Claims, 9 Drawing Sheets

(51) Int. Cl.
*G06K 9/00* (2006.01)
*G06F 3/01* (2006.01)
*G05D 7/06* (2006.01)
*G06Q 50/06* (2012.01)

(52) U.S. Cl.
CPC ........... *G05D 7/0623* (2013.01); *G06F 3/017* (2013.01); *G06K 9/00355* (2013.01); *G06Q 50/06* (2013.01)

(56) References Cited

U.S. PATENT DOCUMENTS

| | | | |
|---|---|---|---|
| 6,691,340 B2* | 2/2004 | Honda | E03C 1/057 4/623 |
| 6,962,162 B2 | 11/2005 | Acker | |
| 9,778,626 B2 | 10/2017 | Nixon et al. | |
| 9,816,257 B2 | 11/2017 | Blake et al. | |
| 2003/0189485 A1* | 10/2003 | Smith | G08B 25/016 340/540 |
| 2006/0006354 A1 | 1/2006 | Guler et al. | |
| 2006/0237674 A1* | 10/2006 | Iott | E03C 1/057 251/129.04 |
| 2007/0057215 A1 | 3/2007 | Parsons et al. | |
| 2010/0313958 A1 | 12/2010 | Patel et al. | |
| 2013/0160202 A1 | 6/2013 | Murata et al. | |
| 2013/0257626 A1 | 10/2013 | Masli et al. | |
| 2014/0282257 A1 | 9/2014 | Nixon et al. | |
| 2015/0308089 A1 | 10/2015 | Thompson et al. | |
| 2017/0268208 A1 | 9/2017 | Lamarche | |
| 2017/0328045 A1* | 11/2017 | Karei | G01S 17/88 |
| 2018/0305906 A1 | 10/2018 | Abdel-Fattah et al. | |

OTHER PUBLICATIONS

Gavrila, "The Visual Analysis of Human Movement: A Survey," Computer Vision and Image Understanding, vol. 73, No. 1, Jan. 1999, pp. 82-98.
Fan et al., "Recognition of Repetitive Sequential Human Activity," IEEE Conference on Computer Vision and Pattern Recognition, Miami, Florida, USA Jun. 20-25, 2009, pp. 943-950.
Fathi et al, "Action Recognition by Learning Midlevel Motion Features," IEEE Conference on Computer Vision and Pattern Recognition, Jun. 2008, pp. 1-8.
Hongeng et al., "Large-Scale Event Detection Using Semi-Hidden Markov Models," Proceedings Ninth IEEE International Conference on Computer Vision, Oct. 13-16, 2003, pp. 1-8.
Gray, "Drinking Water Quality: Problems and Solutions", Cambridge University Press, Apr. 2008, pp. 1-7.

* cited by examiner

WATER MANAGEMENT USING WATER CONSUMING BEHAVIOR TO CONTROL WATER FLOW

CROSS REFERENCE TO RELATED APPLICATION

This application is a continuation of copending U.S. patent application Ser. No. 15/492,588, filed Apr. 20, 2017, the entire contents and disclosure of which are hereby incorporated herein by reference.

BACKGROUND

This invention generally relates to water management, and more specifically, to using a person's movements to control water flow during water using activities.

Water is a precious resource. Millions of people do not have access to clean drinking water, and as many as four thousand children die from water contaminated illnesses every day. Yet, many people continue to be wasteful with their water resources. Therefore, water management is a serious topic because of the importance of the water and due to high demand for water. One of the problems that faces water management is the high volumes of water that are wasted in different ways, particularly, in the household, and specifically, in washbasins, kitchen sinks, baths, and showers.

SUMMARY

Embodiments of the invention provide a method, system and computer program product for managing water consumption when a user engages in a specified water using activity. In an embodiment, the method comprises detecting user movement during said activity using one or more movement sensors; detecting water usage during said activity using one or more water sensors; creating a pattern associating said user movements with said water usage over a specified period of time using input from the one or more movements sensors and the one or more water sensors; and using said pattern to control a supply of water for the user when the user engages in the specified water using activity.

In an embodiment, the detecting user movement includes using the one or more movement sensors to generate user movement data signals representing movement of the user during the water using activity; the detecting water usage includes using the one or more water sensors to generate water data signals representing water usage during the water using activity; and the creating a pattern associating said user movements with said water usage includes processing the user movement data signals and the water data signals to generate a data structure correlating the user movement data with the water data signals.

Embodiments of the invention provide a system and method for water management by making use of the pattern of usage of water over the course of an activity to determine how to control the water flow.

Embodiments of the invention are related to the field of water management, and more specifically, to recording the pattern of water usage for a certain user during a certain activity, then using this pattern to allow and prevent selectively the water flow during the activity.

Embodiments of the invention provide a means first to record the pattern, then to recall the pattern either manually or automatically, and continuously to enhance the pattern for better usage using movement recording and voice commands.

DETAILED DESCRIPTION

An important problem facing water management is the high volumes of water that are wasted in different ways, particularly in households, and specifically, in washbasin, kitchen sinks, baths, and showers. These are different water uses that have two things in common: a pattern of usage, and a potential for better water control.

If the patterns of usage in the different cases for these water uses can be detected, a considerable amount of water can be saved for other uses.

Figure 1:
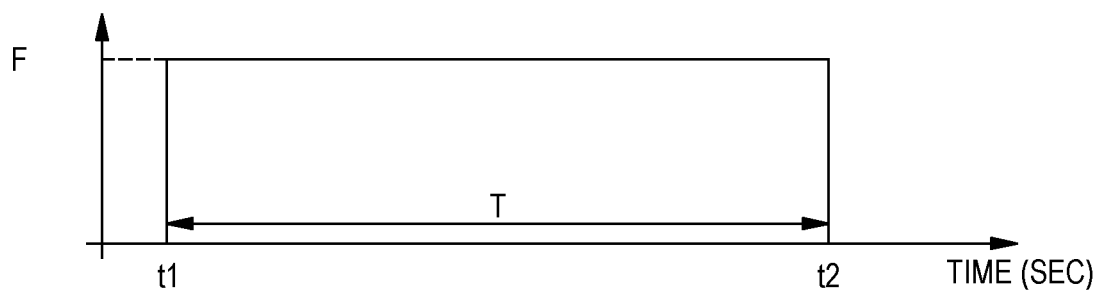
FIG. 1 shows a simple pattern of water flow in which the water flow is constant for a period of time.
Figure 2:
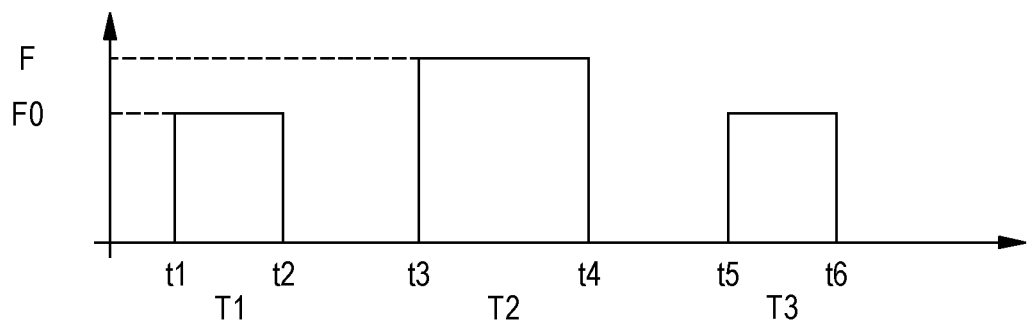
FIG. 2 shows a pattern of water flow in which the water flow is turned on and off a number of times during a period of time.

"Pattern of water usage" is the rate of water flow over time of a certain activity. FIG. 1 shows an example of a simple pattern that is often used in daily life when people brush their teeth. At time t1, the water tap is put in the ON position at a flow rate F for a certain period of time T, when the water tap is then switched to the OFF position at time t2. A more cautious person will use a better pattern, trying to save water during the activity when the water is not needed. FIG. 2 shows that pattern, where a user will switch the flow ON at time t1 with a rate F0 for a period T1 that ends at t2. T1 is the time needed to wash the tooth brush before use. The person will apply the tooth paste and brush his or her teeth while the water is OFF. Then the person will switch the water flow ON for a period T2 with a flow rate F (F>F0) to take water by hand or in a cup to wash the tooth paste from his or her mouth. A person might want to use a towel while the water is OFF, then put the water ON again for T3 with a rate F0 to wash the tooth brush.

Figure 3:
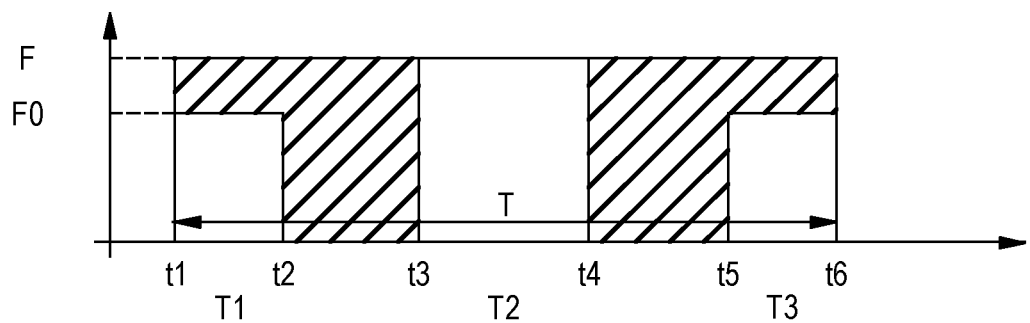
FIG. 3 shows the savings in water between the two patterns of FIGS. 1 and 2.

FIG. 3 shows the considerable saving in water (the hashed area) between the two patterns of usages shown in FIGS. 1 and 2. This water saving can be calculated using the following set of equations:

Water usage in FIG. 1=FT

Water usage in FIG. 2=F0T1+FT2+F0T3

Since F0 is less than F, then the total saving $$=FT-(F0T1+F0T2+F0T3) \qquad \text{i.}$$

Which is, as indicated as the shaded area in FIG. 3, equal to:

$$(F-F0)(T-T2)+F0(T-(T1+T2+T3)) \qquad \text{ii.}$$

There are many water usage patterns that have a potential for better control of water consumption.

Figure 4:
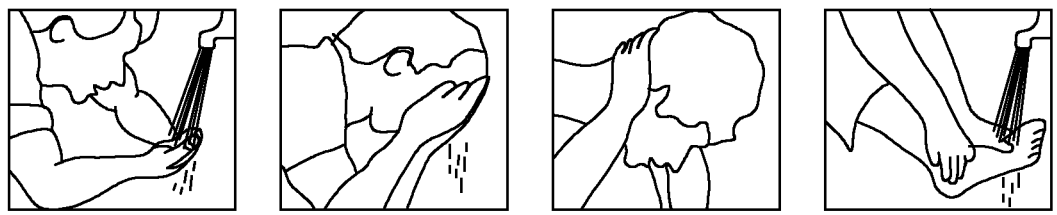
FIG. 4 illustrates a series of movements a person may make while washing his hands, face and feet.

For instance, as illustrated in FIG. 4, many people follow a regular pattern or routine when they wash their faces and hands. If the water dispensed during this process follows the user's pattern, a significant amount of water can be saved during this activity.

In each person's daily life, he or she follows a pattern for each water consumption activity such as washing face, hands and teeth. If these patterns can be linked to a water tap control, there would be an opportunity to prevent a huge amount of wasted water, and the water tap could be controlled for better usage of water. During summer time, the usage of the shower is increased, and most people follow a regular pattern for their showers. In many situations, there are regular patterns for washing dishes and kitchen tools, and washing vegetables.

Figure 5:
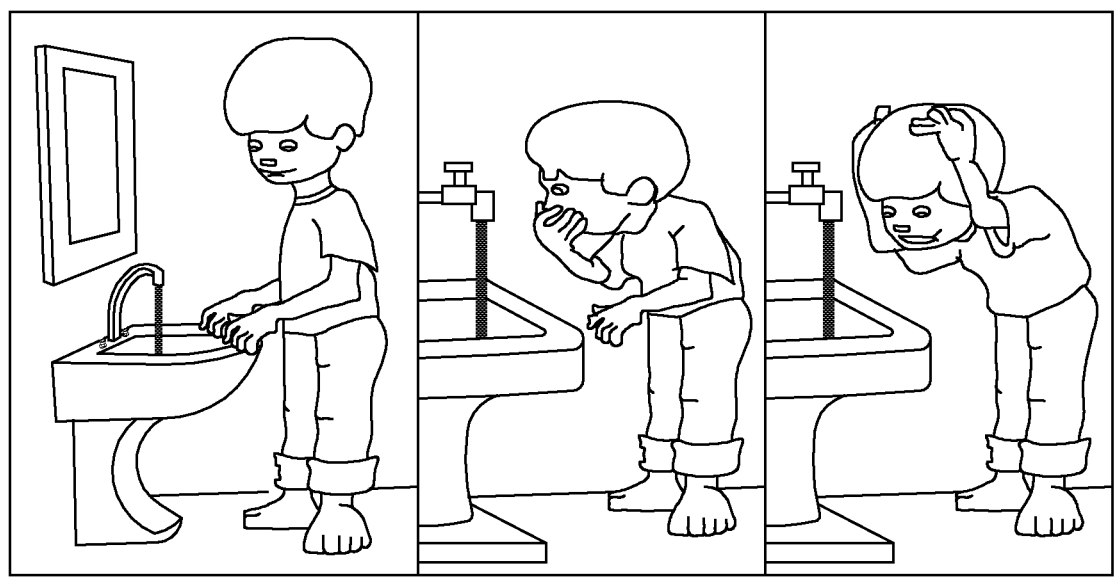
FIG. 5 shows examples of cases where water is not being used efficiently during various activities.
Figure 6:
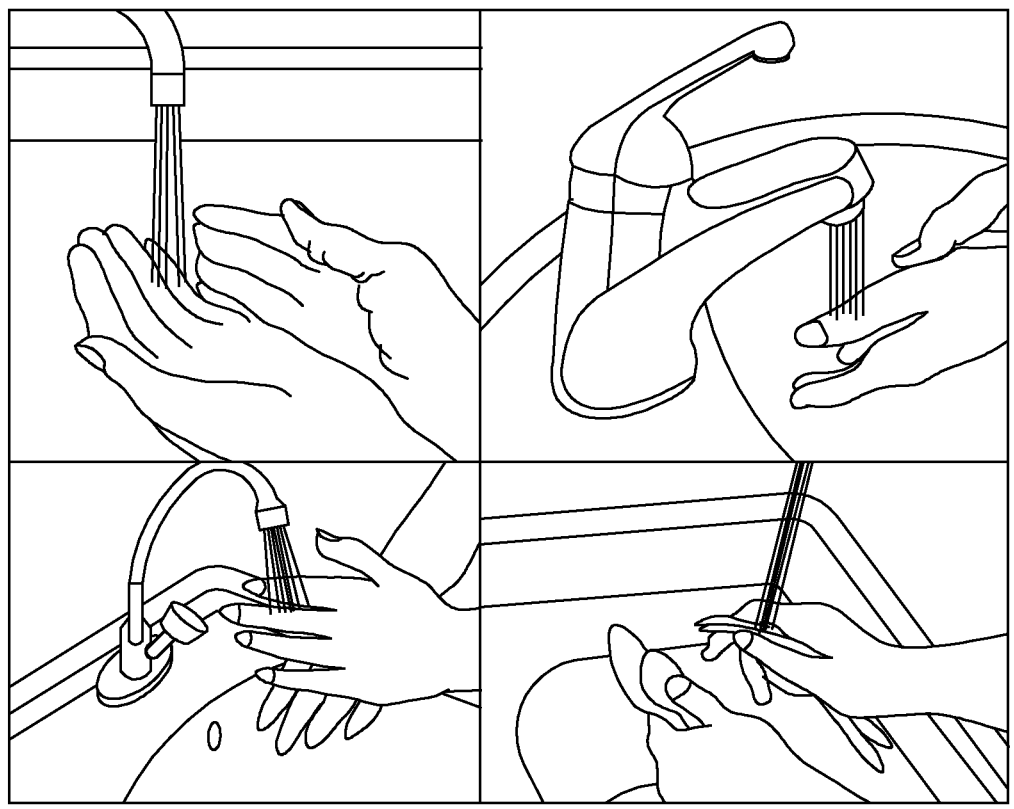
FIG. 6 shows other examples where water is used more efficiently during certain activities.

FIG. 5 shows examples of cases where the water is being wasted during certain intervals of some activities. In these examples, water continues to be run from the water tap or outlet while the user does not need running water, for instance, while the user is washing his hair or face. FIG. 6 shows examples of cases where the water is effectively used during certain intervals of some activities. With these examples, the water is turned on when the user needs running water, and the water is turned off when the user does not need running water. An objective of an embodiment of this invention is to detect the above cases and control the water flow accordingly.

Embodiments of the invention provide a number of advantages over prior art methods and system. Embodiments of the invention ensure a full control of the source of water, which results in a higher volume of saved water. Embodiments of the invention also provide a better user experience for people to help in saving water.

Embodiments of the invention comprise two processes. The first process is the water usage pattern recording, and the second process is the application of the water usage pattern during a certain activity.

Figure 7:
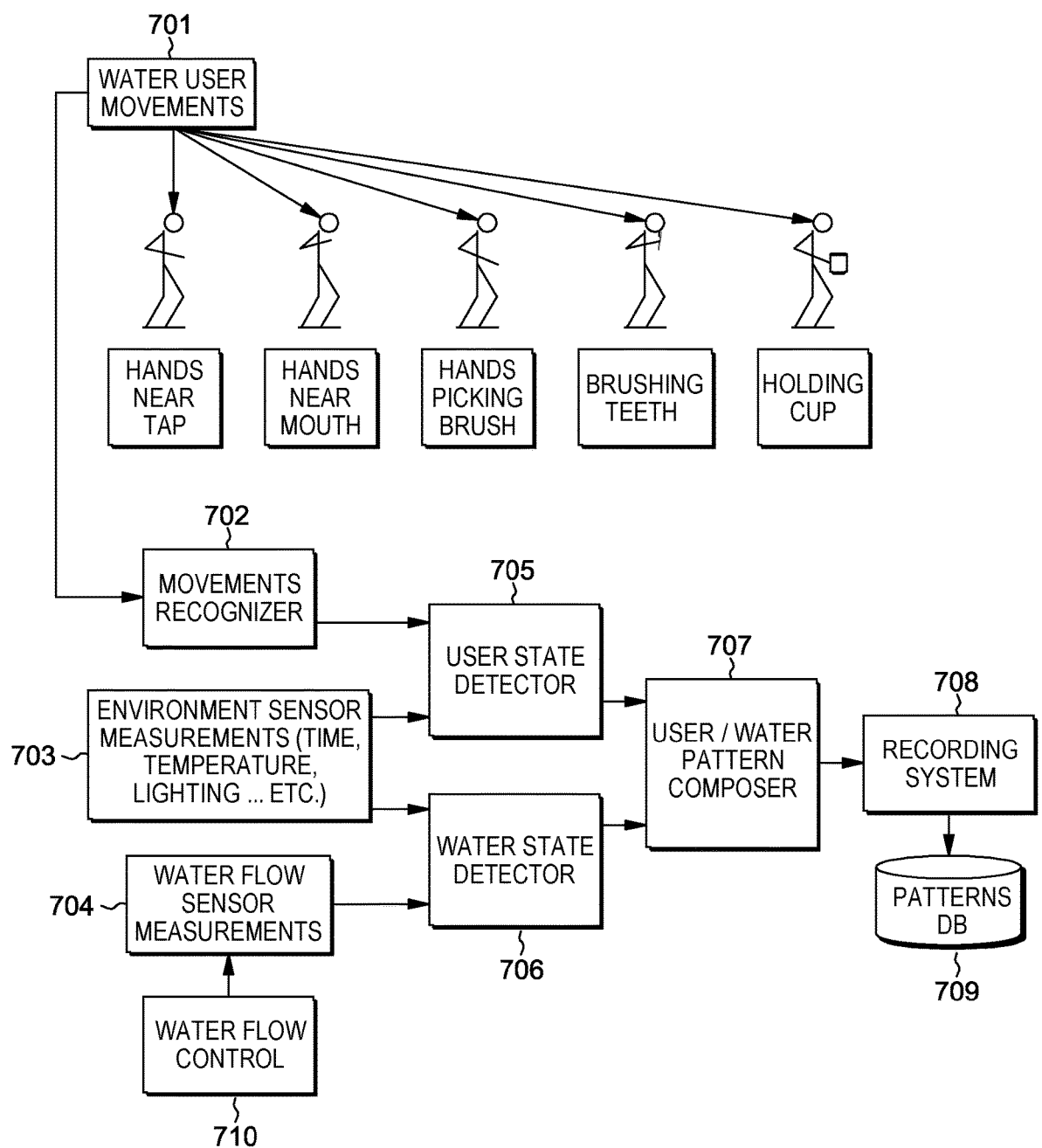
FIG. 7 illustrates a process for recording a water usage pattern.

FIG. 7 shows a block diagram of an example of the first process which is the recording of the pattern. During this process, a user will start to use the water and the pattern will be recorded. The water user movements 701 are recognized using the movement recognizer 702 that can use cameras and sensors to recognize different user movements. Any suitable procedures may be used to recognize these movements, and suitable 3D object reconstruction procedures are well known and understood. Movements like hands near tap, hands near mouth, hand picking up brush, brushing teeth, holding cup, etc., are recognized. Environment sensor measurements 703 such as time, temperature, lighting, etc. are captured. These environment measurements (time of the day, temperature, etc.) can affect the use of water and can also be used to indicate which activity the user will be doing when the pattern is to be applied.

These measurements in addition to the recognized user movements are used by the user state detector 705 to detect the user state. Water state detector 706 uses water flow sensors measurements 704 in addition to environment sensors measurements 703 to detect the water state. The user/water pattern is constructed using the user state and the water state by the user/water pattern composer 707. The pattern is recorded by the recording system 708 and is saved to the patterns database 709.

Figure 8:
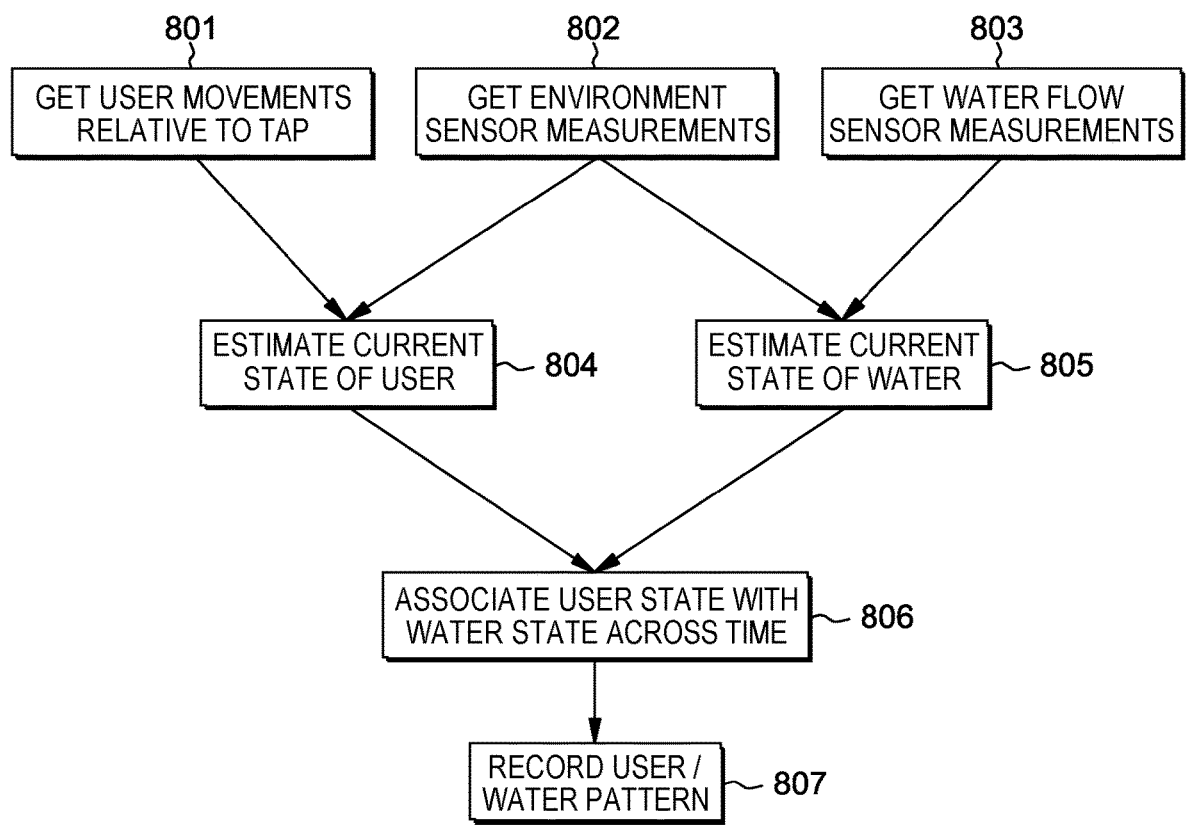
FIG. 8 shows steps of the process of FIG. 7.

FIG. 8 shows the steps of this example process. Step 801 is to get the user movements relative to the water tap, step 802 is to get the environment sensors measurements, and step 803 is to get the water flow sensors measurements. At 804, output from the user movement measurements and the environment sensors measurements are used to estimate the current state of the user. At 805, output from the environment sensors measurements and the water flow sensors measurements are used to estimate the current state of the water. Step 806 is to associate the user state and the water state across time to create the pattern for this activity, and the user and the water patterns are saved and/or recorded at 807.

Figure 9:
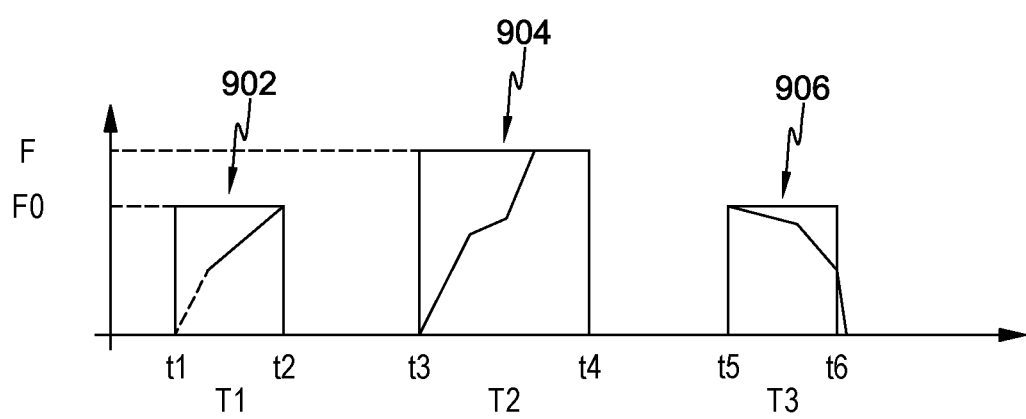
FIG. 9 shows a pattern created in the process of FIGS. 7 and 8, by associating user state and water state across time.
Figure 9:

FIG. 9 shows an example of a pattern created by associating user states and water states across time. With this pattern, the user movements correspond to the user movements shown in FIG. 7. At time t1, when the user's hands are near the water tap, the water would be turned on, and the water flow rate would be increased from time t1 to t2, as shown at 902. At t2 when the user's hands are near his or her mouth, the water would be turned off. At t3, when the user is picking up a tooth brush, the water would be turned back on and the water rate increased, as shown at 904. At t4, while the user is brushing his or her teeth, the water would be turned off. As shown at 906, at t5, when the user is holding a cup, the water is turned back on at a relatively high flow rate, and the flow rate is decreased and then stopped.

Figure 10:
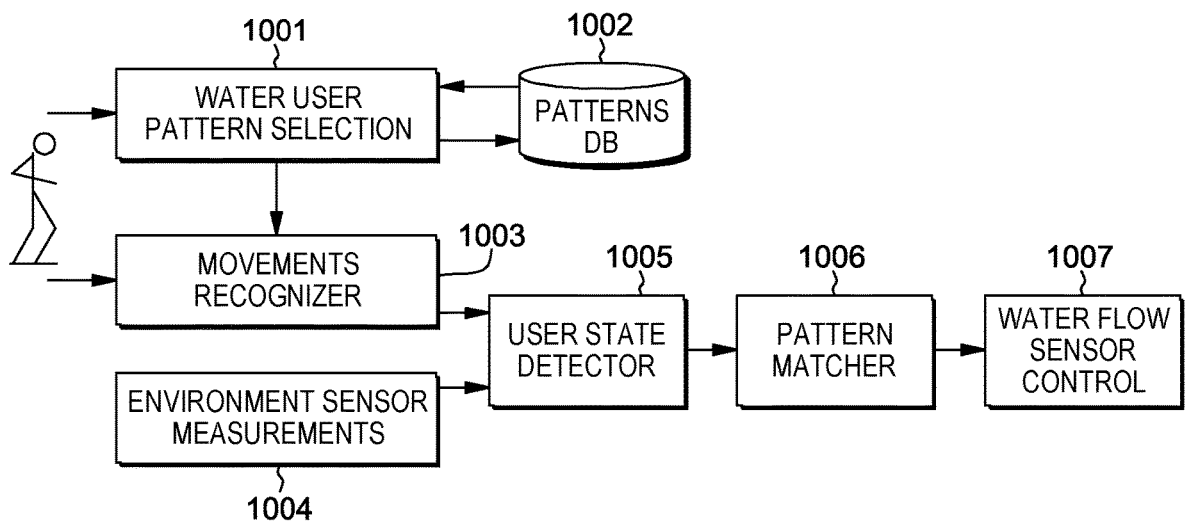
FIG. 10 is a block diagram showing a process in which a water usage pattern is applied during an activity.

FIG. 10 shows a block diagram of an example of the second process, which is the application of the water usage pattern during a certain activity. During this process, a user selects a pattern 1001 either through a menu of patterns from the database 1002, or by using a speech command system to enter the desired pattern. In an embodiment of the invention, the menu of patterns from database 1002 may be displayed on a touch display embedded within the surface of, for example, the mirror in front of the user. The selected pattern is recalled from the pattern database 1002. The system captures the user movements through movement recognizer 1003, captures environment measurements through environment sensors measurements reader 1004, and determines the user state using the user state detector 1005. A pattern matcher 1006 may be used to detect the water flow F based on the user state at time t. The water flow sensor controller 1007 controls the flow of water.

As mentioned above, these environment measurements (time of the day, temperature, etc.) can affect the use of water and can also be used to indicate which activity the user will be doing.

Figure 11:
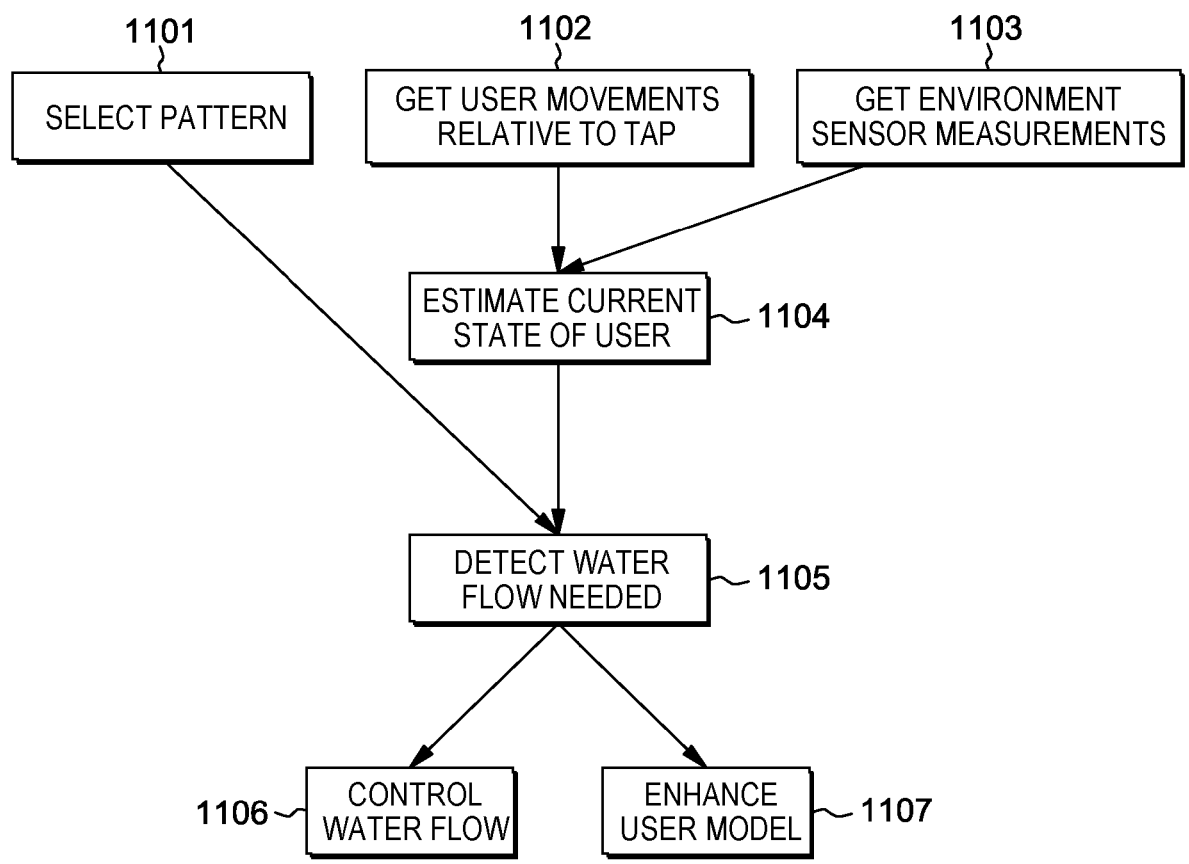
FIG. 11 shows the steps of the process of FIG. 10.

FIG. 11 shows the steps of this process. At 1101, the user selects a pattern, step 1102 is to get the user movements relative to the tap, and step 1103 is to get the environment sensors measurements. At 1104, output from the user movement measurements and the environment sensors measurements are used to estimate the current state of the user. At 1106, the selected pattern and the current user state are used to determine the needed flow of water, and at 1106, the water flow is controlled to provide that needed flow of water. At 1107, the user usage model is enhanced based on any detected waste of water during the user activity.

In embodiments of the invention, the patterns may also be used to control or to determine values for other conditions or parameters of the water like the water temperature. In embodiments of the invention, as an example, the user is provided with water at a controlled or determined temperature when the user engages in the specified water using activities.

Embodiments of the invention record water consumption and other conditions related to the water consumption during the consumption process through one or more of the environmental or water condition sensors. Then, in embodiments of the invention, during applying the water consumption pattern, the or measure or measures that were detected for one or more of these conditions are set at the same measures of the pattern.

As an example, a person wakes up at around 8:00 am on a winter day, and the person starts the water running in the shower and enters the shower when the water temperature warms to 25° C. This pattern is recorded.

When the person uses a system, in accordance with an embodiment of the this invention, the system detects that the person uses the water at 8:00 am in this season, and the system applies the same water consumption rate, with the same water temperature right away without a need for waiting, and gives the person the exact desired water temperature.

Aspects of the invention may be carried out on a computer system. The computer system may be used to receive and process data or signals from the above-discussed water state sensors and detectors, from the user state sensors and detectors, and from the environmental sensors. The computer system may also be used to receive input from and to provide output to the user.

Figure 12:
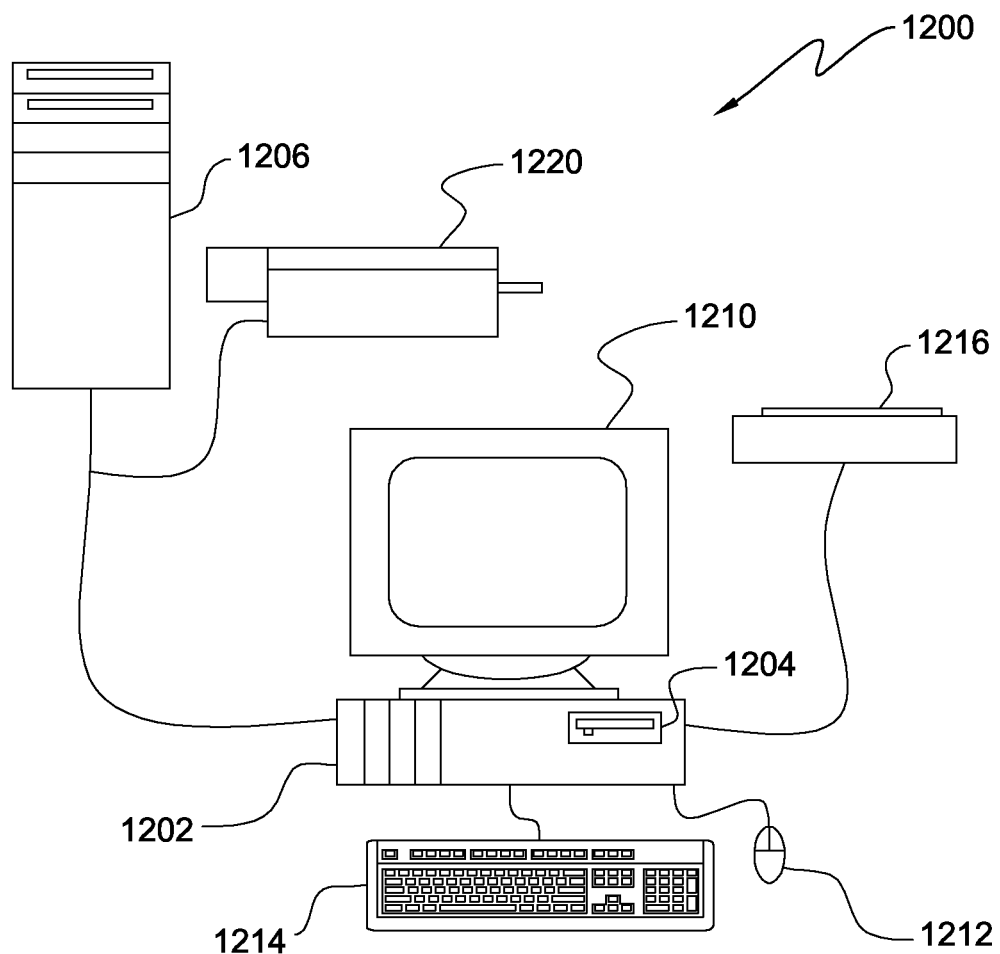
FIG. 12 depicts a computing environment that may be used in embodiments of the invention.

FIG. 12 shows a computing environment 1200 that may be used in the practice of this invention. Referring to FIG. 12, Processing unit 1202, houses a processor, memory and other systems components that implement a general purpose processing system that may execute a computer program product comprising media, for example a floppy disc that may be read by processing unit 1202 through floppy drive 1204.

The program product may also be stored on hard disk drives within processing unit 1202 or may be located on a remote system 1214 such as a server, coupled to processing unit 1202, via a network interface, such as an ethernet interface. Monitor 1206, mouse 1214 and keyboard 308 are coupled to processing unit 1202, to provide user interaction. Scanner 1224 and printer 1222 are provided for document input and output. Printer 1222, is shown coupled to processing unit via a network connection, but may be coupled directly to processing unit 1202. Scanner 1224 is shown coupled to processing unit 1202 directly, but it should be understood that peripherals may be network coupled or direct coupled without affecting the ability of workstation computer to perform aspects of the invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many modifications and variations will be apparent to those of ordinary skill in the art without departing from the scope of the invention. The embodiments were chosen and described in order to explain the principles and applications of the invention, and to enable others of ordinary skill in the art to understand the invention. The invention may be implemented in various embodiments with various modifications as are suited to a particular contemplated use.

The invention claimed is:

1. A method of managing water consumption when a user engages in a specified water using activity, the method comprising: detecting user movements during said activity using one or more movement sensors;
   identifying, from the detected user movements, a plurality of states of the user during said activity; detecting water usage during said activity using one or more water sensors; constructing a water flow pattern using input from the one or more movement sensors and the one or more water sensors, said pattern identifying flow rates of water for the plurality of identified states of the user across time during said activity; and
   using said constructed pattern to control water flow when the user engages in the specified water using activity, including using the constructed pattern to provide the identified flow rates of water for the identified states of the user during said activity of the user; and wherein:
   the detecting user movements during said activity includes detecting defined states of the user at a first plurality of times during said activity;
   the detecting water usage during said activity includes detecting states of the water usage at a second plurality of times during aid activity; and
   the constructing a water flow pattern includes correlating the detected states of the user at the first plurality of times with the detected states of water usages at the second plurality of times.

2. The method according to claim 1, wherein:
the detecting user movement includes using the one or more movement sensors to generate user movement data signals representing movement of the user during the water using activity;
   the detecting water usage includes using the one or more water sensors to generate water data signals representing water usage during the water using activity; and
   the constructing a water flow pattern includes processing the user movement data signals and the water data signals to generate a data structure correlating the user movement data with the water data signals.

3. The method according to claim 1, wherein the detecting defined states of the user includes detecting defined user movements at the first plurality of times.

4. The method according to claim 1, wherein the detecting defined states of the water usage includes detecting defined flows of the water at the second plurality of times.

5. The method according to claim 1, further comprising detecting one or more environmental factors during the specified activity; and wherein the using said pattern to control a supply of water for the user includes using the detected one or more environmental factors in the control of the supply of water.

6. The method according to claim 1, wherein the user repeats the specified water using activity a plurality of times, and the method further comprises:
   obtaining information about movements of the user and water usages during the repeats of the specified water using activity; and
   modifying said pattern based on the obtained information during the repeats of the specified water using activity.

7. The method according to claim 1, wherein during said water using activity, water flows through a water outlet at a controlled, variable rate, and wherein:
   the constructed pattern includes a variable water use rate over a time for the water using activity; and
   the applying said pattern to control a supply of water includes controlling the rate of water flow through the water outlet in accordance with the water use rate of the created pattern.

8. The method according to claim 1, wherein the applying said pattern to control a supply of water for the user includes the user selecting said pattern to control a supply of water for the user during the specified water using activity, including:
   showing a group of patterns to the user on a visual display; and
   the user selecting one of the patterns of said group of patterns.

9. A system for managing water consumption when a user engages in a specified water using activity, the system comprising:

one or more motion sensors for detecting user movements during said activity;

one or more water sensors for detecting water usage during said activity;

one or more processing units for identifying, from the detected user movements, a plurality of states of the user during said activity, and for constructing a water flow pattern using input from the one or more motion sensors and the one or more water sensors, said pattern identifying flow rates of water for the plurality of detected states of the user across time during said activity; and a water control for using said constructed pattern to control water flow when the user engages in the specified water using activity, including using the constructed pattern to provide the identified flow rates of water for the identified states of the user to control a supply of water during said activity of the user; and wherein:

the detecting user movements during said activity includes detecting defined states of the user at a first plurality of times during said activity;

the detecting water usage during said activity includes detecting states of the water usage at a second plurality of times during aid activity; and the constructing a water flow pattern includes correlating the detected states of the user at the first plurality of times with the detected states of water usage at the second plurality of times.

10. The system according to claim 9, wherein the water control controls a condition of the water when the user engages in the specified water using activity.

11. The system according to claim 10, further comprising one or more environment sensors for measuring one or more environment conditions, and wherein:

the one or more water sensors include one or more water condition sensors for measuring specified conditions of the water;

the one or more processor units receive inputs from the one or more environment sensors and from the one or more water condition sensors to identify a temperature and time for supplying the water to the user, and includes said identified temperature and time in the created pattern; and the water control applies said constructed pattern to supply the water at a given location at the identified temperature and time.

12. The system according to claim 9, wherein:

the one or more motion sensors generate user movement data signals representing movement of the user during the water using activity;

the one or more water sensors generate water data signals representing water usage during the water using activity;

the one or more processing units processes the user movement data signals and the water data signals to generate a data structure correlating the user movement data with the water data signals;

the one or more motion sensors detect the defined states of the user at the first plurality of times during said activity; and the one or more water sensors detect the states of the water usage at the second plurality of times during aid activity.

13. The system according to claim 9, wherein the user repeats the specified water using activity a plurality of times, and wherein:

the one or more processor units obtain information about movements of the user and water usages during the repeats of the specified water using activity, and modify said pattern based on the obtained information during the repeats of the specified water using activity;

the system further comprises a display unit for showing a group of patterns to the user on a visual display; and the user selects one of the patterns of said group of patterns to control the supply of water for the user when the user engages in the specified water using activity.

14. A computer program product for managing water consumption when a user engages in a specified water using activity, the computer program product comprising:

a computer readable storage medium having program instructions embodied therein, the program instructions executable by a computer to cause the computer to perform the method comprising:

receiving input from one or more movement sensors representing detected user movement during said activity;

identifying, from the detected user movements, a plurality of states of the user during said activity;

receiving input from one or more water sensors representing detected water usage during said activity;

constructing a water flow pattern using the input from the one or more movement sensors and the one or more water sensors, said pattern identifying flow rates of water for the plurality of detected states of the user across time during said activity; and using said constructed pattern to generate a control signal to control water flow when the user engages in the specified water using activity, including using the constructed pattern to provide the identified flow rates of water for the identified states of the user to control a supply of water during said activity of the user; and wherein:

the detected user movements during said activity includes detected defined states of the user at a first plurality of times during said activity;

the detected water usage during said activity includes detected states of the water usage at a second plurality of times during aid activity; and the constructing a water flow pattern includes correlating the detected states of the user at the first plurality of times with the detected states of water usage at the second plurality of times.

15. The computer program product according to claim 14, wherein:

the input from one or more movement sensors represent the defined states of the user at the first plurality of times during said activity; and the input from one or more water sensors represent the detected states of the water usage at the second plurality of times during said activity.

16. The computer program product according to claim 14, wherein said method further comprises receiving input representing one or more environmental factors during the specified activity; and wherein the using said pattern to generate a control signal includes using the input representing one or more environmental factors to generate the control signal to control the supply of water for the user when the user engages in the specified water using activity.

17. The computer program product according to claim 14, wherein during said water using activity, water flows through a water outlet at a controlled, variable rate, and wherein:

the constructed pattern includes a variable water use rate over a time for the water using activity; and the control signal controls the rate of water flow through the water outlet in accordance with the water use rate of the constructed pattern.

\* \* \* \* \*